G. W. Snyder.
Revolving Rake.
Nº 69036.     Patented Sep. 17, 1867.
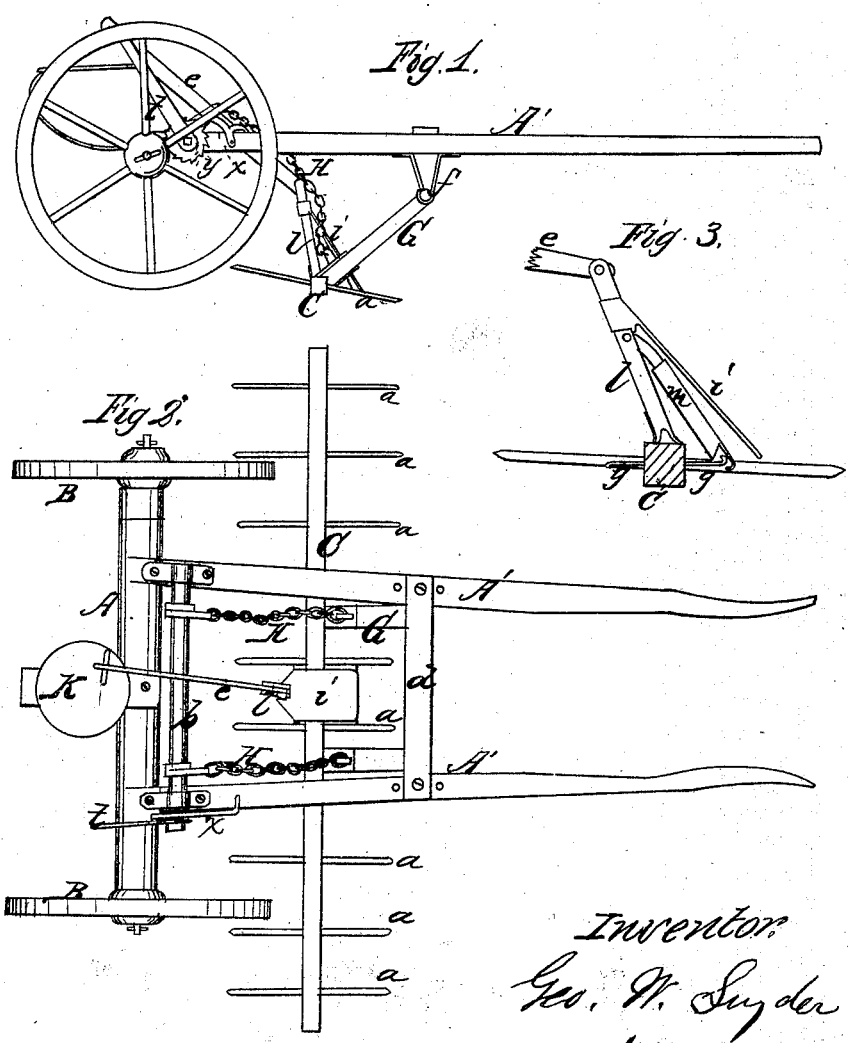
Witnesses.
Inventor:
Geo. W. Snyder
per
Alexander & Mason
Atty.

United States Patent Office.

GEORGE W. SNYDER, OF KALAMAZOO, MICHIGAN, ASSIGNOR TO HIMSELF AND JAMES AIKEN, OF MENDOTA, ILLINOIS.

Letters Patent No. 69,036, dated September 17, 1867.

IMPROVEMENT IN HORSE-RAKES.

The Schedule referred to in these Letters Patent and making part of the same.

TO ALL WHOM IT MAY CONCERN:

Be it known that I, GEORGE W. SNYDER, of Kalamazoo, in the county of Kalamazoo, and in the State of Michigan, have invented certain new and useful Improvements in Horse-Rakes; and do hereby declare that the following is a full, clear, and exact description thereof, reference being had to the accompanying drawings, and to the letters of reference marked thereon, making a part of this specification.

In the annexed drawings, A represents the axle, which is provided with suitable wheels B B and thills A'. Suspended under the rear part of the thills, in front of the wheels B B, is a horizontal rake-shaft, C, which is provided with a series of rakes, $a\,a\,a$, and which said shaft is held to the shafts by means of a small frame, G, which is connected to the thills by means of metal loops $f$ beneath the stay $d$, or in any other suitable manner. The rake-shaft is connected to the rear of this frame by suitable metal bands so as to allow the said shaft to easily revolve therein. $b$ represents a metal shaft running parallel with the axle A, and placed upon the thills directly in front of the same. This shaft is provided with a ratchet-wheel, $y$, at one end, also a hand-lever, $t$, and may be provided with one at each end. Connected to small standards on this shaft, and passing to the rear part of the frame G, are chains, H H, for the purpose of elevating or allowing the rake to be lowered to suit. In the centre of the rake-shaft there are two flat metal plates, $g\,g$, which extend through the shaft, and project at both sides for forming a ratchet to allow the pawl $m$ to catch into and secure the rake. This pawl $m$ is secured upon a bar, $l$, which is connected to the shaft C, between the plates $g\,g$, and is provided with a shield, $i$, to prevent the same from being obstructed. Pivoted to the top of the bar $l$ is a lever, $e$, which extends to the seat K, so that the operator can hold the rake steady or allow it to revolve by releasing the pawl, as desired. By means of the lever $t$ the rake can be raised from the earth or given any angle preferred, and the same can be held in the position by the lever $e$.

Having thus fully described my invention, what I claim as new, and desire to secure by Letters Patent, is—

1. The arrangement of the rake C with its plates $g\,g$, pawl $m$, bar $l$, shield $i$, and lever $e$, with the swinging frame G, in the manner and for the purposes specified.

2. The combination of the axle A with its wheels and thills A', provided with shaft $b$, with lever and ratchet rake-shaft C, with teeth $a\,a$, frame G, chains H H, and pawl $m$ with lever $e$, all arranged and used in the manner set forth.

In testimony that I claim the foregoing invention I have hereunto set my hand and seal this 3d day of July, 1867.

G. W. SNYDER.

Witnesses:
    JAS. AIKEN,
    A. B. GOULD.